United States Patent
Noble

(10) Patent No.: US 9,094,539 B1
(45) Date of Patent: Jul. 28, 2015

(54) DYNAMIC DEVICE ADJUSTMENTS BASED ON DETERMINED USER SLEEP STATE

(75) Inventor: Isaac S. Noble, Soquel, CA (US)

(73) Assignee: AMAZON TECHNOLOGIES, INC., Reno, NV (US)

(*) Notice: Subject to any disclaimer, the term of this patent is extended or adjusted under 35 U.S.C. 154(b) by 433 days.

(21) Appl. No.: 13/240,709

(22) Filed: Sep. 22, 2011

(51) Int. Cl.
  *H04W 88/02* (2009.01)
  *H04N 7/00* (2011.01)
  *H04N 21/00* (2011.01)

(52) U.S. Cl.
  CPC . *H04N 7/00* (2013.01); *H04N 21/00* (2013.01)

(58) Field of Classification Search
  None
  See application file for complete search history.

(56) References Cited

U.S. PATENT DOCUMENTS

| | | | |
|---|---|---|---|
| 7,701,434 B2* | 4/2010 | Kreek et al. | 345/102 |
| 8,289,115 B2* | 10/2012 | Cretella et al. | 335/219 |
| 8,373,355 B2* | 2/2013 | Hoover | 315/291 |
| 2002/0135474 A1* | 9/2002 | Sylliassen | 340/540 |
| 2007/0208841 A1* | 9/2007 | Barone et al. | 709/223 |
| 2008/0037837 A1* | 2/2008 | Noguchi et al. | 382/118 |
| 2008/0165116 A1* | 7/2008 | Herz et al. | 345/102 |
| 2009/0170480 A1* | 7/2009 | Lee | 455/414.1 |
| 2010/0107184 A1* | 4/2010 | Shintani | 725/10 |
| 2010/0295839 A1* | 11/2010 | Nagaya et al. | 345/212 |
| 2010/0296370 A1* | 11/2010 | Holmes et al. | 368/73 |
| 2011/0129196 A1* | 6/2011 | Hayashi | 386/234 |
| 2011/0274405 A1* | 11/2011 | Godar | 386/224 |
| 2012/0057513 A1* | 3/2012 | Kong et al. | 370/311 |
| 2012/0178402 A1* | 7/2012 | Krishnamoorthy et al. | 455/404.1 |
| 2012/0254909 A1* | 10/2012 | Serdiuk | 725/12 |
| 2013/0135198 A1* | 5/2013 | Hodge et al. | 345/156 |

\* cited by examiner

*Primary Examiner* — Dave Czekaj
*Assistant Examiner* — Mohammad J Rahman
(74) *Attorney, Agent, or Firm* — Novak Druce Connolly Bove + Quigg LLP

(57) ABSTRACT

An electronic device performs functionality adjustments based on a determined attention level of a user of the device. In some embodiments, the device automatically enters a sleep mode upon determining that the user has fallen asleep. The device may automatically modify functionality of the device such that disturbances to the user is minimized or power consumption is reduced. For example, the device may lower the volume of a ring tone or deactivate a communication channel. In some instances, the device may determine that the user is half-awake or paying an intermediate level of attention and activate an intermediate mode where at least some functionality is modified or adjusted. A device subsequently determining that the user is fully awake or actively engaged with the device causes the device to return to a standard mode of operation, where functionality of the device is adjusted to one appropriate for the user's attention level.

28 Claims, 8 Drawing Sheets

DYNAMIC DEVICE ADJUSTMENTS BASED ON DETERMINED USER SLEEP STATE

BACKGROUND

People are utilizing electronic devices, particularly portable electronic devices, for an increasing number and variety of tasks. In many instances, these electronic devices provide various notifications to users when the devices receive incoming text messages, e-mails, and/or phone calls. Often, these notifications alert the users through the playing of a vibrant ring tone, a bright flashing on a screen of the device, and/or the performance of a vibration of the device. In some instances, these notifications might disturb the user when the user does not want to be disturbed, such as when the user is resting or sleeping. In those situations, the user must remember to manually adjust the volume such that the device does not disturb the user every time a new notification is received. Further, a user must also manually turn off or adjust any functionality that the user does not want active while the user is sleeping, and must remember to reactivate that functionality when the user is awake, which can be inconvenient for the user and can potentially cause problems when the user forgets to reactivate certain functionality.

BRIEF DESCRIPTION OF THE DRAWINGS

Various embodiments in accordance with the present disclosure will be described with reference to the drawings, in which.

DETAILED DESCRIPTION

Figure 1A:
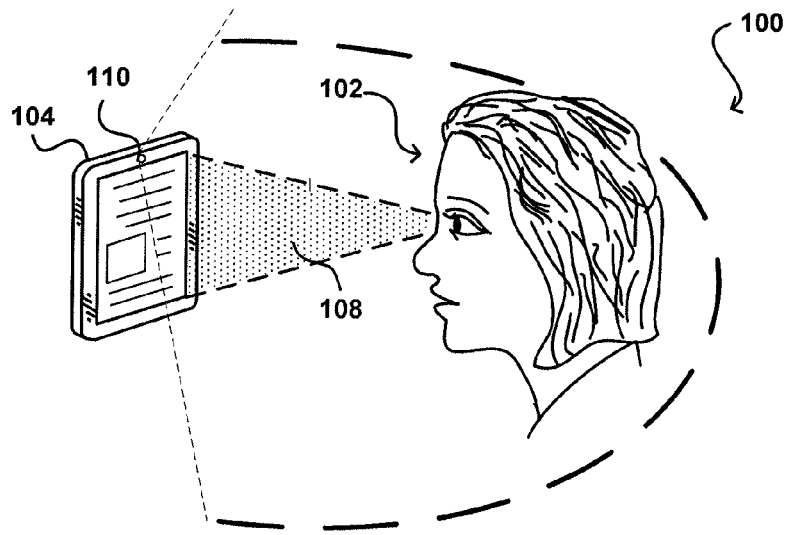
FIGS. 1(a)-1(b) illustrate an example situation of a person using an electronic device while the device is in a standard mode of operation and an example of the electronic device operating in the standard mode in accordance with various embodiments.

Systems and methods in accordance with various embodiments of the present disclosure may overcome one or more of the aforementioned and other deficiencies experienced in conventional approaches to managing functionality on an electronic device. In particular, various embodiments enable an electronic device to activate and/or execute an attention detection mode where the device may adjust functionality on the device in accordance with a determined attention level of a user. For instance, when the attention detection mode is activated on an electronic device, the device may determine whether a user of the electronic device is asleep or awake. Based on such a determination, the device might deactivate certain functionality, or adjust an operational state of one or more functional aspects of the phone. In other embodiments, a device when in an attention detection mode might adjust the operational state of various functional aspects based on whether the user is actively engaged with the device, is alert but not focusing on the device, has recently left the room, on in another such attention state.

The device of some embodiments determines an attention level of at least one user by analyzing image information captured of a user, listening to user breathing patterns, monitoring user pulse rate, observing user movement, and the like. In some embodiments, the device may determine that the user has a low attention level or is asleep when a determined amount of user movement is below a certain threshold. The device of some embodiments may then automatically adjust certain functionality, such as to lower the volume of the ring tone and/or decrease the brightness level of a display screen if the user is determined to be asleep or when the attention level is determined to be below a threshold. Enabling the electronic device to automatically adjust certain functionality on the device in accordance with a determined user attention level or sleep/wake state minimizes the likelihood that the user of the device will be disturbed in situations that the user may not want to be disturbed. In some instances, the device can automatically adjust various functionality to conserve power and/or resources for aspects of the device that will not be used while the user is asleep, such as to deactivate wireless Internet connectivity.

In one embodiment, a user sleep state detection mode may be activated in response to a specific action or event, such as a user selection of a user interface item, reaching a particular hour, sensing a particular motion, etc. When the user sleep state detection mode is activated, image information is continually captured and analyzed by an electronic device of some embodiments. The device of some embodiments may be operating in a standard mode setting where the functionality of the device is set in such a way that is appropriate during normal awake hours. For instance, the device may operate in a standard mode setting where the ring tone is a vibrant ring and that the brightness level of a display element of the electronic device is fairly high.

In some embodiments, the electronic device may determine a user sleep/wake state or attention level (i.e., whether the user is asleep, awake, half-awake, paying full attention, etc.) by analyzing the captured image information. Some embodiments may detect a head or a face from the captured image information using a head or face detection algorithm.

Once a face or head is detected, the device may use image or facial recognition to determine whether the detected face or head belongs to the user of the electronic device. The device of some embodiments may then determine whether the user is awake by determining whether the user's eyes are closed and/or whether the eyes have been closed for an extended period of time.

Some embodiments emit infrared (IR) radiation from the device to detect IR radiation reflected from the user to determine whether the user's eyes are open. As known in the art, the human eye reflects certain IR wavelengths differently than the rest of a human's face, such that the pupils can quickly and easily be located using the reflected IR. The device of some embodiments may then determine that the user is in a sleep state if the eyes are determined to be closed (or tracking the pupil movement enables the device to determine that the user is in REM sleep) and for some duration of time (e.g., five minutes, twenty minutes).

In some embodiments, the electronic device further determines that the user is likely in a sleep state by detecting a brightness level of an area around the user. For instance, the device may determine that the user is asleep by detecting that the area around the user has been dark for some period of time, in combination with a user's eyes being closed or a user being inactive for a period of time. Further, the electronic device may determine that the user is likely in a sleep state by also determining that the user is usually asleep beyond a certain hour (i.e., using learned knowledge). Different embodiments may perform the determination that the user is asleep differently. Upon determining that the user is asleep, the device of some embodiments enters a sleep mode. Functionality of the device is adjusted as the sleep mode is activated. In some embodiments, the device turns off all its external lights, adjusts the brightness level of the screen, limits the type of notifications that may alert the user, and deactivates a number of functionalities of the device when sleep mode is activated. Upon determining that the user is asleep, the device automatically enters a sleep mode where functionality is adjusted such that disturbances to the user may be minimized.

In some embodiments, the image information is continually captured and analyzed to enable the electronic device to determine when the user is awake. Some embodiments determine that the user may be awake or half-awake by tracking the eye movement of the user. Similarly, the device may detect the user's face, perform facial recognition, and track the pupils to determine whether the user is awake. Other or additional factors may be considered by the electronic device in performing this determination as to whether the user is awake. Some embodiments may determine that the user is awake if the device detects user eye movement and that a current time is beyond the alarm that was set by the user. In some embodiments, the device determines that the user is half awake when the device detects that the user is looking at the device and that the current time is sometime in the middle of the night. Different embodiments may perform this determination differently.

When the device determines that the user is half awake, the device of some embodiments may enter an intermediate mode where information is displayed and/or some functionality is activated or adjusted. In some embodiments, preliminary information display is presented by a display screen of the device such that a current time and date is displayed. This enables the user to quickly determine the current time (and/or other information) without activating the rest of the functionality of the device (e.g., allowing calls through, vibrant ring tone, bright screen) at a minimum level of disturbance to the user. The device of some embodiments uses an ambient light sensor to determine the brightness level of a surrounding area and displays the information in at a brightness level that is comfortable to the user. Some embodiments detect a pupil size to determine the appropriate brightness level in which to display the information.

When the device determines that the user is awake, the device may enter a standard or typical operating mode where functionality of the device is again adjusted. Some embodiments enable the device to automatically enter the standard mode upon detecting a particular hand gesture from the user of the device. The device of some embodiments may determine to enter the standard mode when the device determines that the user's eyes are open and for an extended period of time. Different embodiments may perform this determination that the user is awake differently. By enabling the electronic device to automatically adjust its functionality based on a determined user sleep state, the device may minimize its potential disturbances to the user. This is useful in the situation where the user falls asleep without manually adjusting functionality of the device.

Various other applications, processes and uses are presented below with respect to the various embodiments.

Figure 1B:
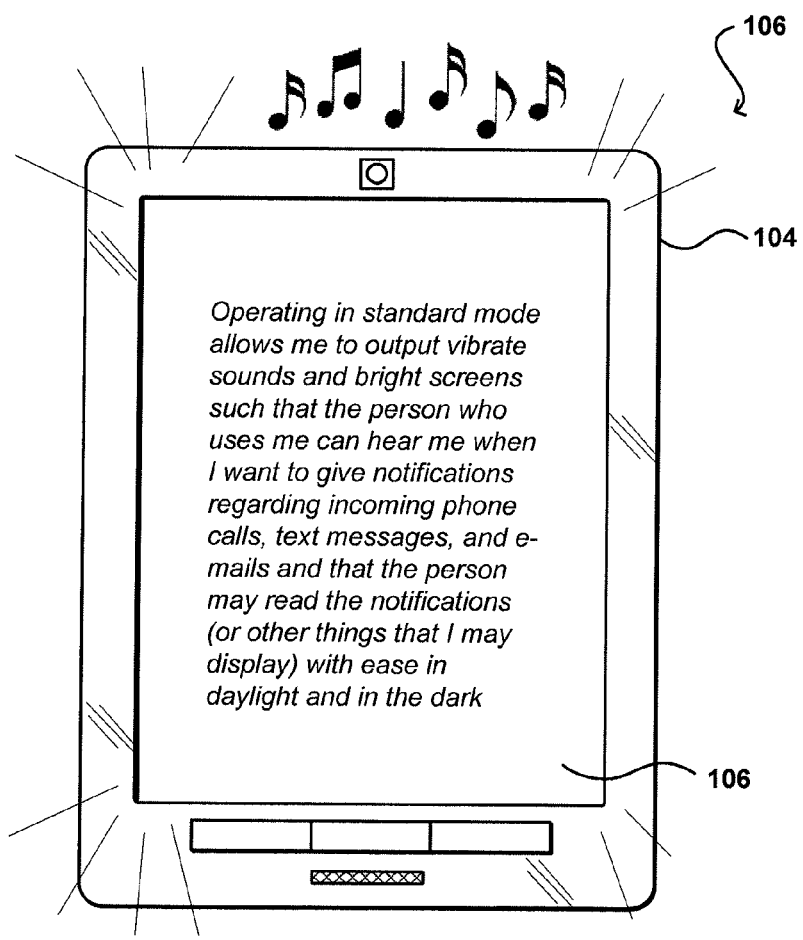

FIGS. 1(a)-1(b) illustrate an example situation 100 of a person 102 using an electronic device 104 while the device is in a standard mode of operation and an example 106 of the electronic device 104 operating in the standard mode. Although a portable computing device is depicted here in FIG. 1(b), the electronic device may be a desktop computer, laptop computer, tablet computer, smartphone, media player, personal digital assistants (PDAs), electronic book reading devices, etc. A user of an electronic device may use the device for a number of functionalities, such as checking e-mails, reading news articles, text messaging, calling friends, listening to music, etc. When the electronic device is operating in the standard mode (e.g., full-power mode or other similar operating modes), the user has ready access to the various functionalities provided by the device.

FIG. 1(a) illustrates an example situation 100 where the user 102 is viewing content being displayed on the electronic device 104. While viewing the content on the device, the viewing angle or gaze direction will fall within a given range 108, where that range is relative depending upon factors such as movement of the user or the device, etc. The device of some embodiments may detect that the user is looking at the screen of the device using one or more imaging elements 110 (e.g., camera(s)) of the device. as the given range 108 may be within the device's detectable range. Although only one imaging element (e.g., a camera) is shown in this example, the device of some embodiments may have more than one imaging element to enable the device to capture a wider range of area around the device.

In some embodiments, the device uses one or more cameras or other such imaging elements (e.g., a charge-coupled device (CCD), a motion detecting sensor, an infrared (IR) sensor, etc.) to capture image information over a range of angles around the device. For example, the device may capture information over a full 360° range around the device. In some embodiments, the device may determine whether the user of the device is asleep or awake by capturing eyelid movement or pupil movement of the user using the various imaging elements and then analyzing the captured information.

FIG. 1(b) illustrates an example 106 of the electronic device 104 operating in the standard mode where the user has ready access to the various functionalities of the device. In some embodiments, the standard operating mode may be distinguished from a sleep mode, low-power mode, or other similar modes, where various functionalities may be placed on standby and require a restoration (e.g., upon selection of a user-interface item) before the various functionalities of the device are readily available. In this example, the device operating in standard mode displays objects on the display element 106 of the device at its maximum brightness (e.g., indicated by the brightness marks) or at an ideal brightness level for the user. Further, the device outputs the audio ring tone at its standard volume (e.g., a default volume, an increased volume level, a volume specified by the user), as indicated by the musical notes in the figure.

Figure 2A:
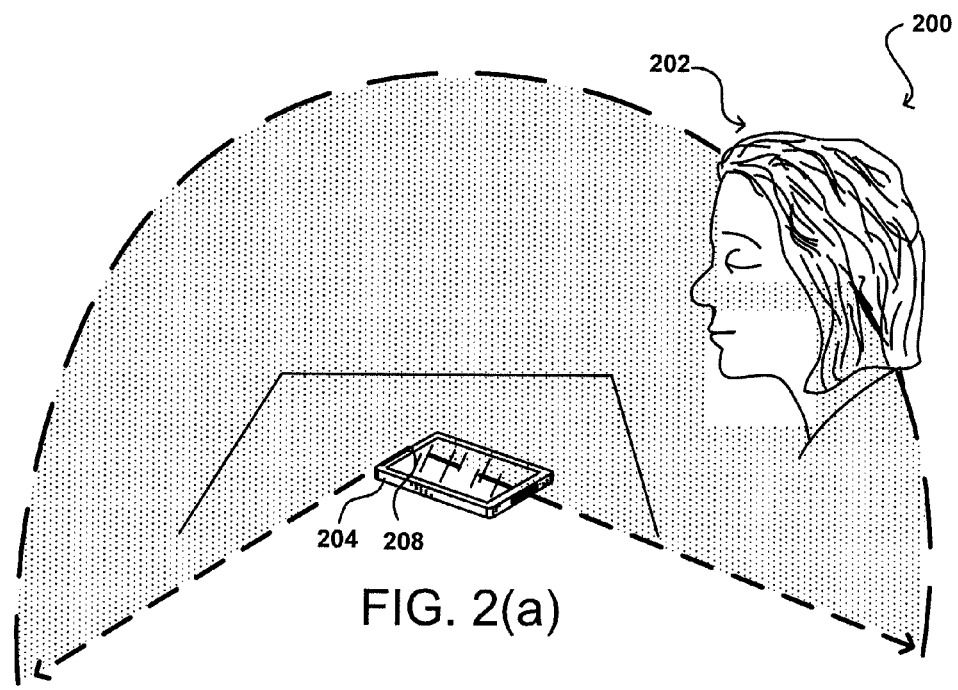
FIGS. 2(a)-2(b) illustrate an example situation where a user of an electronic device has fallen asleep and an example of an activation of a sleep mode on the electronic device upon a determination that the user is asleep in accordance with various embodiments.
Figure 2B:
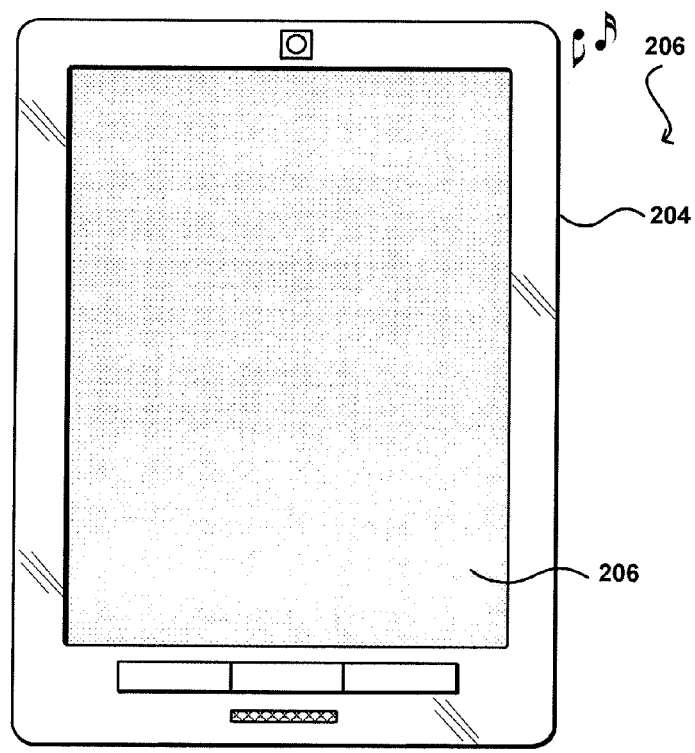

FIGS. 2(*a*)-2(*b*) illustrate an example situation 200 where a user 202 of an electronic device 204 has fallen asleep and an example 206 of an activation of a sleep mode on the electronic device 204 upon a determination that the user is asleep. The device of some embodiments may determine that the user has fallen asleep by capturing image information that includes at least a portion of the user and analyzing the captured image information. As mentioned above, the device may capture image information using one or more imaging elements (e.g., camera(s) 208, IR sensor(s), ambient light sensor(s)) on the device. Using one or more imaging elements, the device may capture image information of a wide range of area around the electronic device.

In some embodiments, the device may use the captured image information to determine whether to enter a sleep mode. The captured image information may include a portion of the user of the electronic device. For instance, the captured image information may include the user's eyes such that the device may monitor how long the user's eyes has been closed. In some embodiments, the captured image information may include a brightness level of an area near the user of the electronic device. The device of some embodiments may then determine to enter a sleep mode upon detecting a trigger or a combination of triggers (e.g., that the user's eyes have been closed for more than five minutes, that the user has not been looking at the device for more than three hours, that the area surrounding the user has been dark for more than twenty minutes, etc.) from the captured image information.

FIG. 2(*a*) illustrates the electronic device 204 capturing image information (e.g., using a camera 208) to determine whether to enter a sleep mode. As mentioned, some embodiments enable the device to enter a sleep mode upon determining that the user of the electronic device has fallen asleep. Some embodiments determine that the user is asleep by performing an initial 360° scan to locate people nearby or detect one or more faces in the vicinity. The device of some embodiments performs image recognition on the detected faces to recognize the user(s) of the device, such that the device may enter a sleep mode only upon detecting that the user of the device has fallen asleep. In this example, the device 204 determines that the user 202 has fallen asleep upon detecting that the eyelids of the user have been closed beyond a threshold amount of time (e.g., three minutes).

Upon recognizing the user(s) of the device, some embodiments may determine whether the user is asleep by tracking the pupils. Approaches for providing such functionality can be found in co-pending U.S. patent application Ser. No. 12/786,297, filed May 24, 2010, entitled "Determining Relative Motion As Input," which is hereby incorporated herein by reference. Some embodiments may determine that the user is not asleep by being able to track the pupils. In some embodiments, the device may perform further analysis on the pupil movement to determine whether the user is asleep.

While in this particular example the device enters a sleep mode upon determining that the user's eyelids have been closed beyond a threshold amount of time, some embodiments may determine to enter a sleep mode upon further detecting (e.g., using an ambient light sensor, a camera) that the brightness level has dropped below a threshold level beyond a period of time or upon determining that the current time is beyond a time when the user usually goes to bed (e.g., past 1 a.m.). Different embodiments may determine to enter a sleep mode upon a different trigger or upon meeting a combination of triggers.

FIG. 2(*b*) illustrates an example 206 of the electronic device 204 operating in the sleep mode upon determining that the user 202 of the electronic device is asleep. In some embodiments, the device may enter a sleep mode, a low-power mode or a similar mode, where fewer functionalities are active compared to when the device is operating in a standard mode. When the device enters a sleep mode, functionality on the device may be adjusted or limited. In one instance, a device operating in a sleep mode may turn off any external lights that may be emitted by the device when the device is operating in a standard mode. In another instance, the device may disable any notifications (e.g., incoming emails, text messages, phone calls) when operating in a sleep mode such that disturbances to the user is minimized.

Further, some embodiments may filter interactions such that only certain notifications would alert the user. In one instance, the user may configure the device such that the user only receives calls and/or texts from a pre-selected set of contacts, such as family members. In another instance, the user may configure the device such that the user only receives alerts and notifications from a pre-selected set of applications (or certain functions within one or more applications), such as the Facebook® application or Outlook®. While operating in a sleep mode, the device may also inform the user of such notifications differently from when the device is operating in a standard mode. For instance, the device may output a soft melody or perform a vibrate when a call is received to avoid waking the user with a vibrant ring and minimize disturbances to the user. In this example, the screen 206 of the device 204 is dimmed as the device is operating in a sleep mode, as shown by the grayed screen. Moreover, the user has configured the device in this example such that the device outputs a soft chime (as indicated by the small musical notes) when the user receives a phone call from a particular group of contacts (e.g., coworkers, business partners, family members). The user may configure the device to adjust certain functionality of the device upon entering a particular mode. For instance, some embodiments enable the user to configure the device such that even upon entering a sleep mode, the device continues to play music whereas other functionality may be disabled.

Some embodiments enable the user to configure the device such that the device does not enter a sleep mode upon determining that the user is asleep. This is useful because the user may be relaxing by the pool with his or her eyes closed instead of sleeping. In some embodiments, the device enables the user to deactivate the user sleep state detection mode through a selection of a user-selectable user interface item on the device. Further, some embodiments enable the user to specify whether to enter a sleep mode upon determining that the user is asleep or upon determining that other persons are asleep. This is useful when there are multiple users for the device as they may want the device to continue operating in a standard mode while they are still awake.

As the electronic device operates in a sleep mode, the device of some embodiments may continually or periodically observe an area surrounding the device in order to determine whether to activate an intermediate mode or to return to the standard operating mode of the device. In some embodiments, the device may enter an intermediate mode where information (e.g., time, date, etc.) is displayed upon observing that the user has opened his or her eyes and looked at the device. Different embodiments may activate the intermediate mode upon detecting a different set of triggers.

Figure 3A:
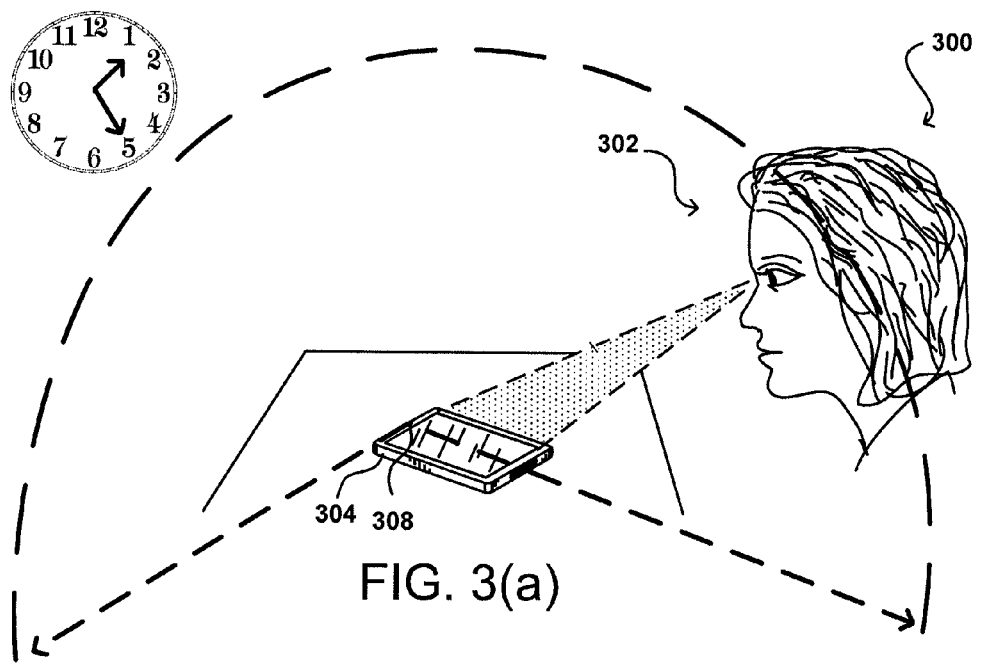
FIGS. 3(a)-3(b) illustrate an example situation where an electronic device operating in a sleep mode detects that a user of the device is awake and an example of the electronic device entering an intermediate mode upon a determination that the user is awake in accordance with various embodiments.
Figure 3B:
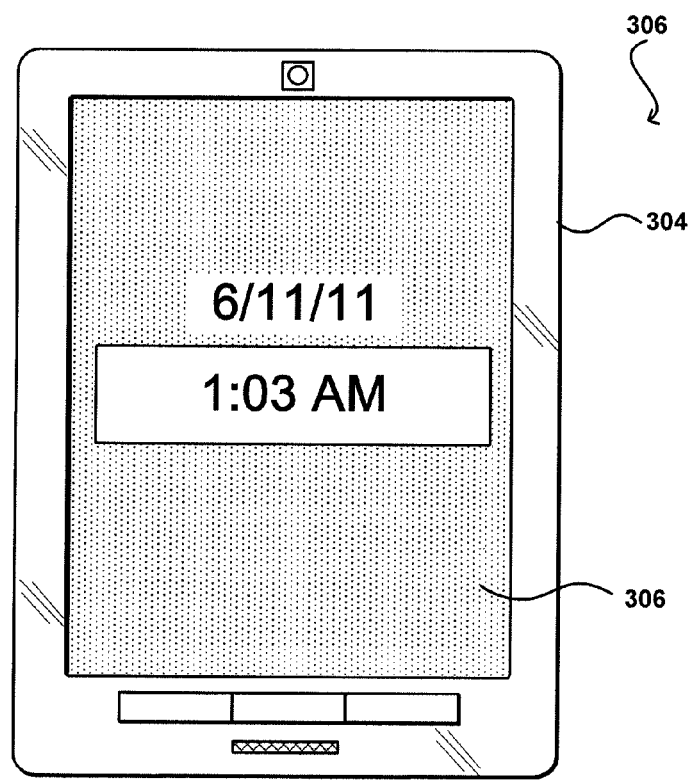

FIGS. 3(a)-3(b) illustrate an example situation 300 where an electronic device 304 operating in a sleep mode detects that a user 302 of the device is awake and an example 306 of the electronic device 304 entering an intermediate mode upon a determination that the user is awake. It should be understood that similar functionality could be activated when a user goes from a low attention level to an intermediate attention level, or otherwise changes a determined level of attention. In some embodiments, the device determines that the user of the device is awake, or at least at some intermediate level of attention, when the device detects that the user has his or her eyes open, and in at least some embodiments is looking at or toward the device. The device of some embodiments captures image information that includes at least a portion of the user (e.g., a recognizable portion of the user's face) and analyzes the captured image information in order to determine an attention or awake state of the user. The device may use more than one type of imaging elements (e.g., cameras, IR sensors, ambient light sensors, etc.) to capture the image information. If the surrounding area is dark, the device of some embodiments may use only the IR sensors and/or ambient light sensors to capture image information. While this example illustrates image information constantly being captured while the user is asleep, the device enables the user to activate a privacy mode where the device stops capturing image information of the user.

FIG. 3(a) illustrates the electronic device 304 capturing image information (e.g., using an IR sensor 308 on the device) to determine whether to activate an intermediate mode, a standby mode or a similar mode. Some embodiments capture image information using a camera, a heat sensor, an ambient light sensor, etc. when determining whether to activate the intermediate mode. When the intermediate mode is activated, the device of some embodiments display a preliminary information display that includes the time, date, weather, etc. on the display screen of the device. In some embodiments, the device may display certain information (e.g., configurable by the user of the device) while most of the functionality of the device remains in a state similar to when the device was operating in the sleep mode.

In this example, the captured image information indicates that the user 302 is awake and looking at a display element 306 of the device 304. Some embodiments analyze the captured information and determine whether the user is awake and/or looking at the device. In some embodiments, the device detects a face from the captured information. The device then performs image or facial recognition to determine whether the detected face belongs to the user of the electronic device. Some embodiments may compare the detected face with user information stored on the device or retrievable by the device (e.g., through a network connection) to determine whether the detected face belongs to the user(s) of the electronic device. As the electronic device of some embodiments may have multiple users, the device may perform this comparison against the user information of multiple users.

Upon determining that the detected face matches the user of the electronic device, the device may determine whether the user is awake and looking at the device by monitoring the user's eyes or eyelids. Some embodiments determine whether the user is awake by determining the user's gaze direction and/or field of view (viewing location) through pupil tracking. In some embodiments, the device may determine that the user is awake and looking at the device by tracking the pupil movement of the user.

Some embodiments enable the device to enter an intermediate mode upon determining that the user of the electronic device is in an awake state or is otherwise at an intermediate level of attention. In this example, the device 304 determines that the user 302 has woken up (e.g., by observing the user's pupil movements). The device thereby enters an intermediate mode upon detecting that the user's eyes are open and looking at the device. Some embodiments enter the intermediate mode upon detecting different types of triggers or upon detecting a different set of triggers. In one instance, the device may enter an intermediate mode upon detecting a gaze in the direction of the device from any person and/or a rise in the user's body temperature. In another instance, the device may enter an intermediate mode upon determining that the user is looking at the device and that the current time is between 10 p.m. and 6 a.m. (i.e., within normal sleeping hours).

FIG. 3(b) illustrates an example 306 of the electronic device 304 operating in the intermediate mode upon determining that the user 302 of the electronic device is in a wake state. In some embodiments, the device may enter an intermediate mode, a standby mode or a similar mode, where less functionality is active compared to when the device is operating in a standard mode, but more functionality is active compared to when the device is operating in a sleep mode. When the device enters the intermediate mode from a sleep mode, functionality on the device may be adjusted such that the device provides a preliminary information display (e.g., time, date, weather, current news, etc.). It should also be understood that the intermediate mode can be entered from a full attention mode, where at least some of the functionality can be deactivated or functional states changed due at least in part to a decreased level of attention.

In some embodiments, the preliminary information display provides information to which the user wants ready access. For instance, the user may want to be able to quickly check the time when the user wakes up in the middle of the night. Therefore, some embodiments may provide a preliminary information display that includes a current time. Different embodiments may provide a preliminary information display that includes different information, such as a number and/or types of notifications, a current temperature, etc. Further, the type of information displayed in the preliminary information display may be configurable by the user (e.g., through a preference setting of the device).

The device of some embodiments may detect a brightness level around the device (e.g., using an ambient light sensor) such that the preliminary information display may be presented in a less obtrusive manner. For instance, the device may present the information using a brightness level (reflected from the display screen of the device or from one or more external LEDs of the device) less than the brightness level of when the device is operating in a standard mode. In this example, the device 304 displays a time and a date upon detecting that the user 302 is awake and looking at the device. Some embodiments display different information further based on a current time. In some embodiments, the device may display additional information, such as updated news, when the device determines that the current time (i.e., when the user is awake) is past a certain hour or close to when the user's alarm was designated to go off. Since the current time in this example is 1:25 a.m., the device displays the information designated for the intermediate mode (i.e., the time and date).

In some embodiments, the intermediate mode is an informational mode where information is displayed for a short period of time (e.g., five seconds) such that the user may quickly obtain the desired information. Some embodiments may return to a sleep mode after the information is displayed for a predetermined period of time. While the device is in an intermediate mode, the device may continuously observe the user and perform further adjustments based on a gesture input by the user. In some embodiments, the device may return or activate the standard mode upon receiving a particular gesture input.

Figure 4A:
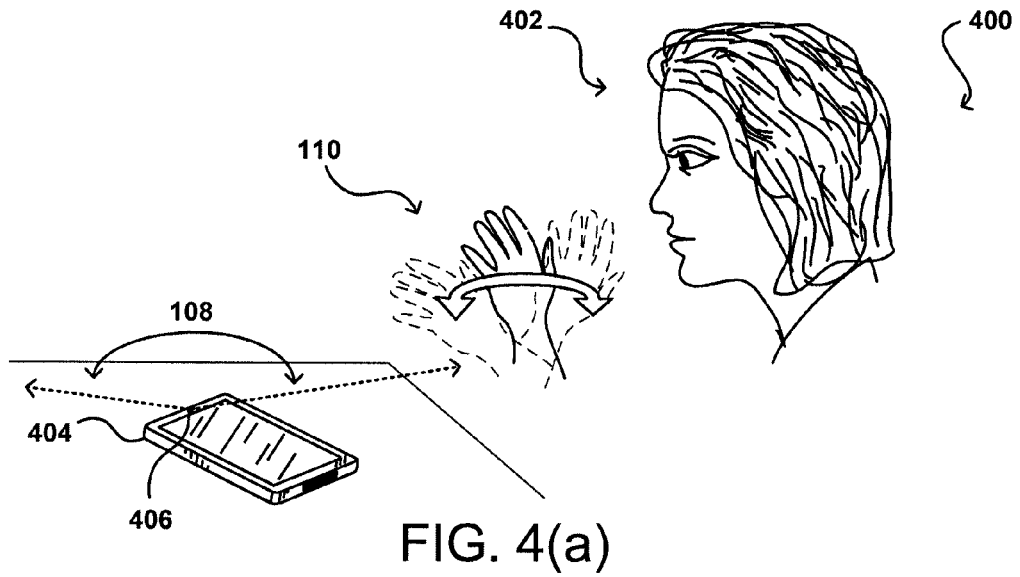
FIGS. 4(a)-4(b) illustrate an example situation where an electronic device operating in an intermediate mode detects that a gesture movement from a user of the device and an example of the electronic device entering a standard mode upon a detection of the gesture movement in accordance with various embodiments.
Figure 4B:
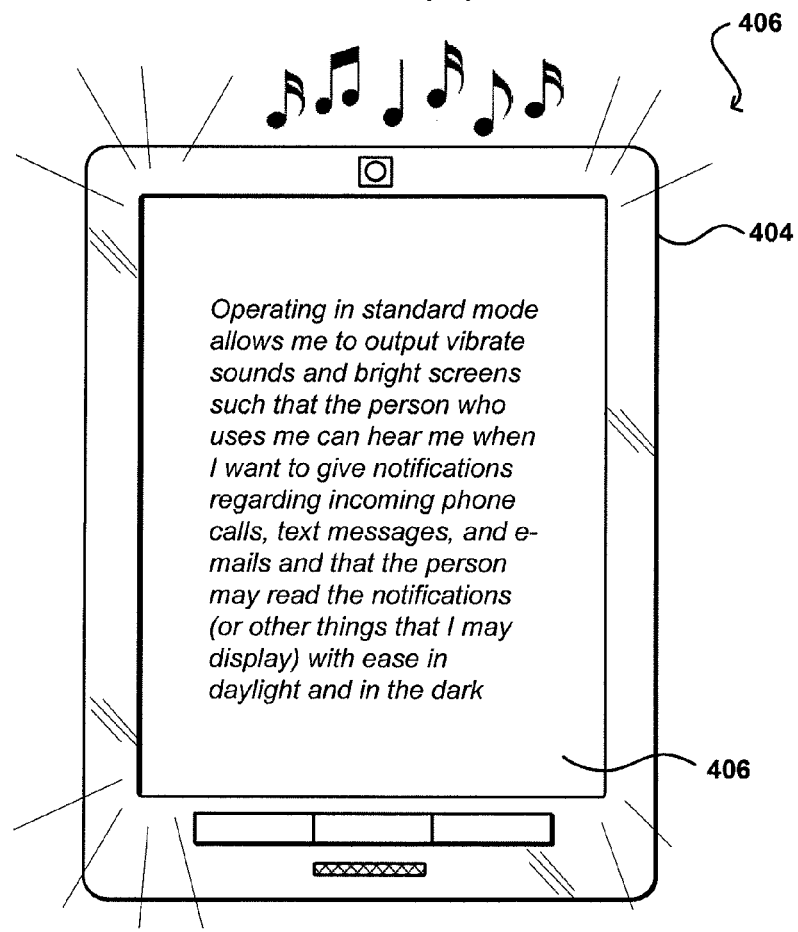

FIGS. 4(a)-4(b) illustrate an example situation 400 where an electronic device 404 operating in an intermediate mode detects that a gesture movement from a user 402 of the device and an example 406 of the electronic device 404 entering a standard mode upon a detection of the gesture movement. In some embodiments, the device determines to activate or return to the standard mode upon detecting a trigger such as a particular gesture, a user selection of a user interface item on the device, an hour set by an alarm on the device, etc. The device of some embodiments captures image information that includes at least a portion of the user and analyzes the captured image information in order to determine whether to activate the standard mode. As described above, the device may use one or more imaging elements on the device to capture image information. The device may use more than one type of imaging elements (e.g., cameras, IR sensors, ambient light sensors, etc.) to capture the image information.

FIG. 4(a) illustrates the electronic device 404 capturing image information (e.g., using a camera 408 on the device) to determine whether to activate a standard mode, a full-power mode or a similar mode. Some embodiments capture image information using a camera, an IR sensor, etc. when determining whether to activate the standard mode. When the standard mode is activated, the device of some embodiments performs all of its normal functions (e.g., receiving phone calls, outputting notifications, etc.).

In this example, the camera 408 on the device 404 captures a hand gesture performed by the user 402 while the device is in an intermediate mode. Some embodiments analyze the captured information and determine whether captured information corresponds to a particular command. In this case, the captured hand gesture corresponds to a request to enter a standard mode. Approaches for determining gesture- and/or motion-based input can be found in co-pending U.S. patent application Ser. No. 13/170,164, filed Jun. 27, 2011, entitled "Camera Based Sensor For Motion Detection," which is hereby incorporated herein by reference.

As the device determines that the user's hand gesture corresponds to a request to return to a standard mode of operation, the functionality of the electronic device are modified accordingly. In FIG. 4(b), the functionality of the electronic device 404 is adjusted such that functionality for the corresponding mode, the standard mode, is now activated/restored. The user may receive phone calls, text messages, e-mails, calendar reminders etc. at the normal volume, as indicated by the musical notes. The brightness level of the screen (or one or more external LEDs on the device) 406 is also increased to a normal brightness level that is ideal for the user in an awake state.

Figure 5:
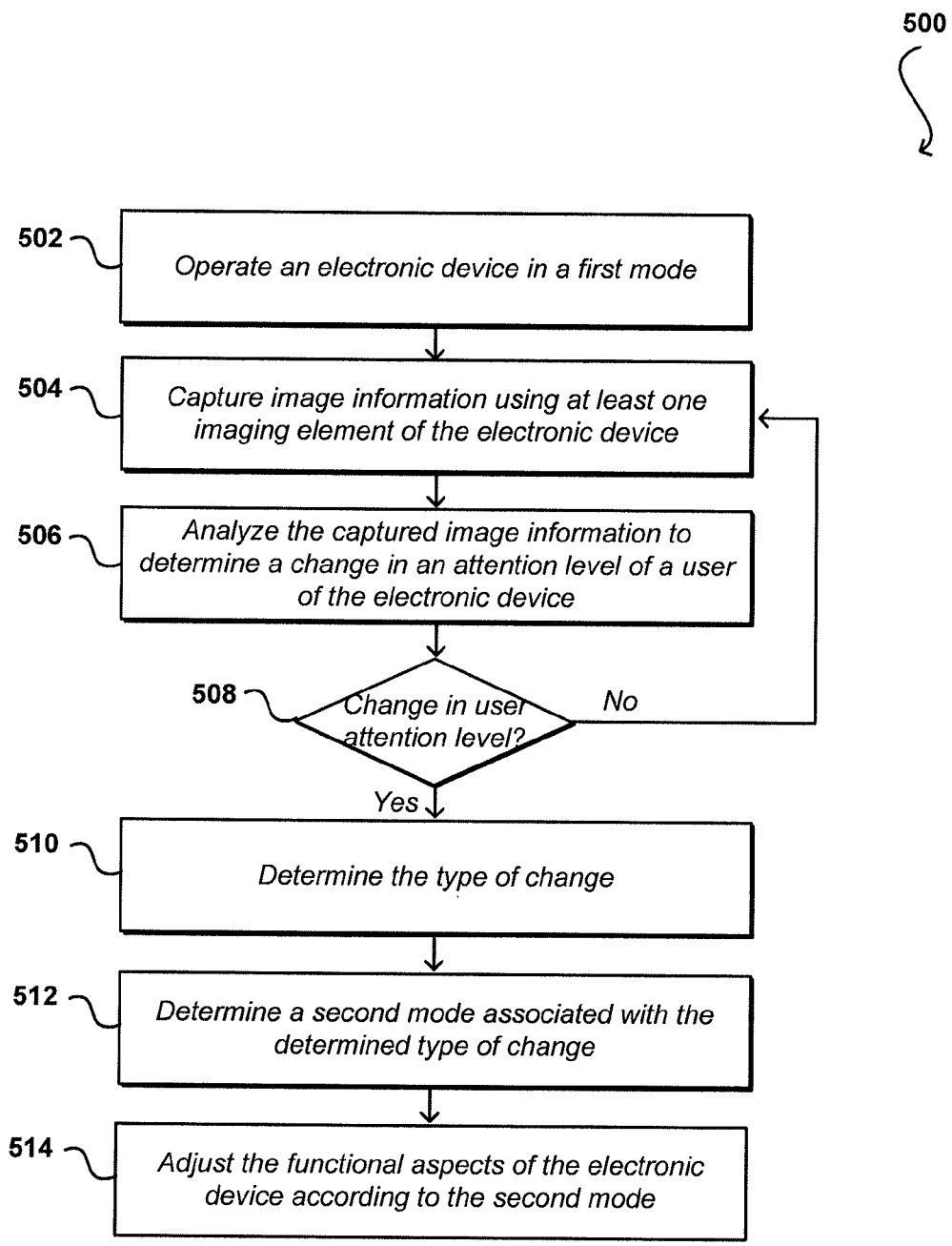
FIG. 5 illustrates an example process for enabling an electronic device to determine when to modify functionality of the electronic device in accordance with various embodiments.

FIG. 5 illustrates an example process 500 for enabling an electronic device to determine when to modify functionality of the electronic device in accordance with various embodiments. It should be understood that, for any process discussed herein, there can be additional, fewer, or alternative steps performed in similar or alternative orders, or in parallel, within the scope of the various embodiments unless otherwise stated. In this example, an electronic device is operated in a first mode 502. In some embodiments, the first mode is a standard mode, or a default mode, that is activated as soon as the device is powered on. The first mode may be a sleep mode (e.g., corresponding to a lowest attention state or lowest conscious state), or a low-power mode, where functionality of the device is adjusted such that power consumption and disturbances to the user is minimized. In some embodiments, the first mode may be an intermediate mode (e.g., corresponding to a partial attention state) where informative information (e.g., time, date, etc.) is displayed to the user while maintaining minimal disturbances to the user. The first mode may be activated upon user selection of a user-selectable UI item on the device in some embodiments.

In some embodiments, image information is captured using at least one imaging element of the electronic device 504. In some embodiments, the image information includes image information for at least a portion of a user of the electronic device. The image information in some embodiments includes a brightness level of an area around the electronic device. In some embodiments, the image information may include video and/or still images. As mentioned above, the at least one imaging element of the electronic device may include one or more IR sensors, cameras, iris detectors, heat sensors, etc. for capturing the image information. The device of some embodiments may use one or a combination of different imaging elements to capture the image information. Some embodiments may capture the image information continuously or periodically (e.g., every few seconds) while the device is operating in the first mode.

The captured image information is then analyzed to determine a change in an awake state or a change in an attention level of a user of the electronic device 506. In some embodiments, the captured image information includes a portion of the user, such as the user's face, eyes, hands, chest, etc. By analyzing the captured image information, the device may determine whether the user is awake (i.e., with full attention), asleep (i.e., with little attention), performing a particular gesture, with partial attention, etc. In one example, the device of some embodiments may analyze captured information of the user's chest to determine that the user's breathing rate has slowed down beyond a threshold value, indicating that the user is likely asleep or having a low attention/consciousness level. In another example, the device may analyze captured information of the user's blood vessel(s) to determine that the user's heart rate has sped up, indicating that the user is likely awake or with high attention/consciousness level. Some embodiments may also analyze captured information of the user's eyes (e.g., eyelids, pupils) to determine whether the user is awake or asleep.

The device of some embodiments then determines whether there is a change in the user awake state 508. In some embodiments, the device determines there is a change in the awake state of the user by detecting one or more or a combination of triggers (e.g., eyes of the user opens and looks at the device, hand gestures) in the environment. Upon detecting the trigger(s), the device may determine that the user is no longer awake or asleep. If the device do not detect a change in the user awake state, the device returns to 504 and continues to capture image information using at least one imaging element of the device.

If the device detects a change in the user awake state or attention level, the type of change is determined 510. The device of some embodiments determines whether the change in the awake state or attention level is one where the user was sleeping is now awake (e.g., attention level from low to high), or the other way around. In some embodiments, the change in the user awake state or attention level may be one where the user was asleep (e.g., low attention level) and is now in an intermediate state (e.g., partial attention level) where the user may only be temporarily awake to check the time on the device as opposed to being fully awake (e.g., high attention level). A second mode associated with the change is then determined in some embodiments 512. Some embodiments may determine that the change from being awake to being asleep (e.g., a high attention level to a low attention level) is associated with a sleep mode. The intermediate or standby mode may be associated with the user waking up temporarily in the middle of the night or the user being at an intermediate attention level. Further, the change from the user being half-asleep or from being asleep to being awake (e.g., a low or a partial attention level to a high attention level) may be associated with an awake mode or a standard mode where functionality is fully restored.

One or more functional aspects of the electronic device is then adjusted according to the second mode 514. In response to determining the change in the awake state or attention level of the user, the electronic device is modified from operating in the first mode to the second mode. If the device is modified from operating in a sleep mode to an intermediate mode, the device may display information on the display screen of the device. Functional aspects such as the ring tone level, the type of ring tone, the brightness level of a display screen, the LEDs on a device, the phone calls that are presented to the user, etc. may be adjusted as the device goes into a sleep mode from an awake or standard mode. Although not specifically mentioned here, various other functionality of the device may be adjusted upon a determination of a change in an awake state or attention level of the user.

Figure 6:
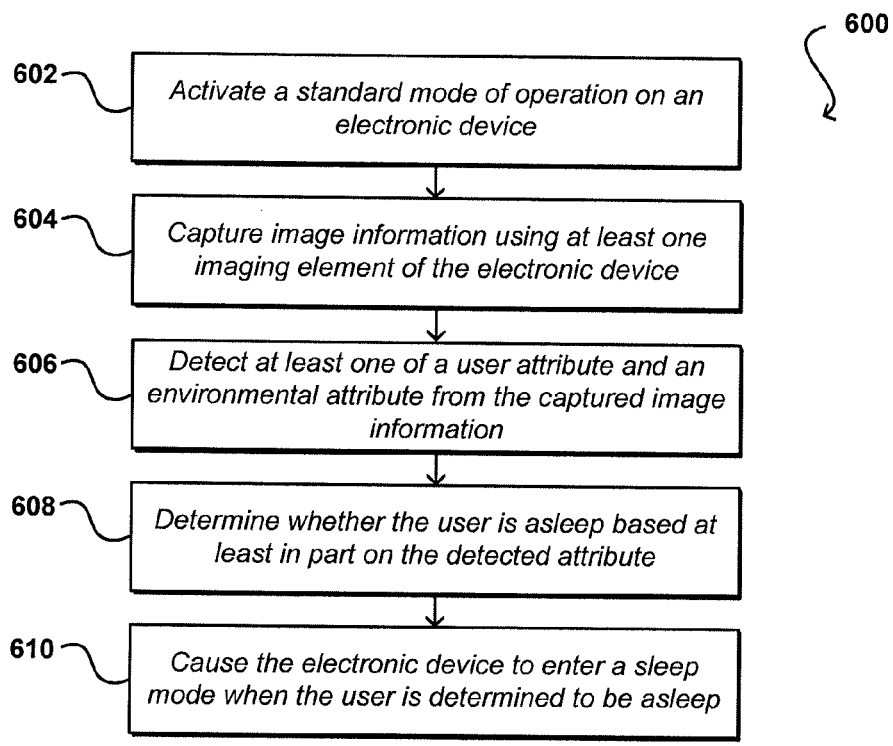
FIG. 6 illustrates an example process for enabling an electronic device to enter a sleep mode upon determining that a user of the electronic device is asleep in accordance with various embodiments.

FIG. 6 illustrates an example process 600 for enabling an electronic device to enter a sleep mode upon determining that a user of the electronic device is asleep in accordance with various embodiments. In this example, a standard mode of operation on an electronic device is activated 602. Image information is captured using at least one imaging element of the electronic device 604. At least one of a user attribute and an environmental attribute is detected from the captured image information 606. Some embodiments may analyze the captured image information to detect at least one of a user attribute and an environmental attribute. In some embodiments, the captured image information may include a portion of the user's body, such as the user's face, eyes, chest, hand, etc. By analyzing the captured image information, the device of some embodiments may determine whether the user is awake, asleep, making a gesture input, etc. Some embodiments analyze an environmental attribute such as a brightness level of a surrounding area or a current time to determine an awake state of the user.

The device of some embodiments determine whether the user is asleep based at least in part on the detected attribute(s) 608. In one example, the device may determine whether the user is asleep based on the detected eyes of the user. The device may analyze the eyes to determine that the user is asleep or awake. In another example, the device of some embodiments may analyze captured information of the user's chest to determine that the user's breathing rate has slowed down beyond a threshold value, indicating that the user is likely asleep. The device of some embodiments may determine that the user is asleep by determining that a current time is in the middle of the night (e.g., 2 a.m.) in addition to detecting that the user's eyes have been closed beyond a duration of time (e.g., five minutes).

The electronic device is caused to enter a sleep mode when the user is determined to be asleep 610. In some embodiments, functionality of the device is adjusted as the device is caused to enter the sleep mode. For instance, the device may adjust the ring tone to a vibrate mode upon receiving any type of notification. The device may filter certain interactions such that only phone calls, emails, text messages from a pre-selected set of persons are permitted to alert the user. The brightness level of a display screen may be toned down upon sleep mode activation. Various other functionality may be adjusted upon the activation of the sleep mode.

Figure 7:
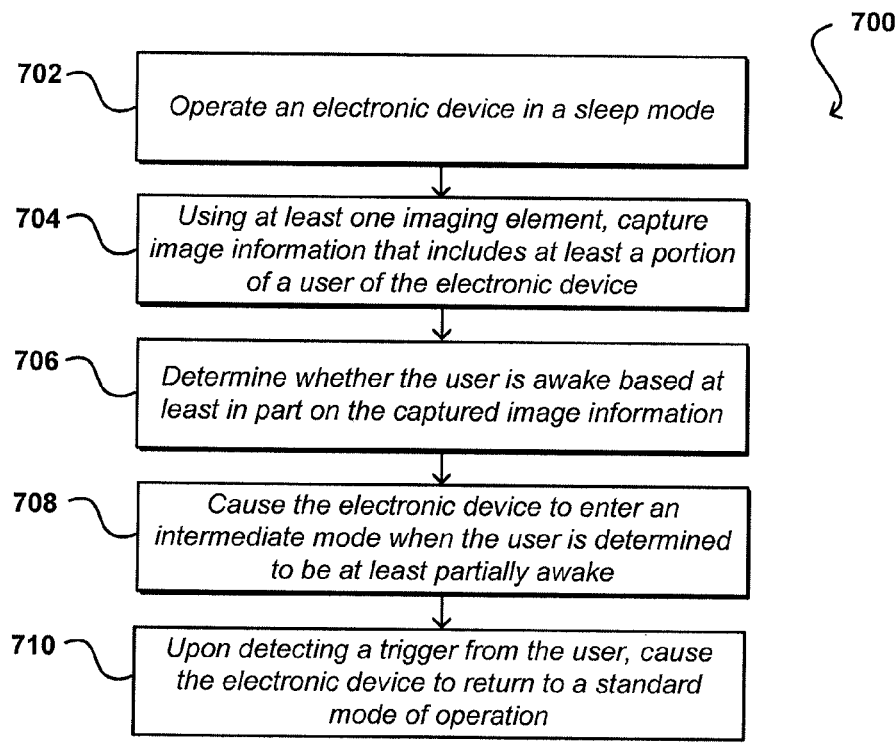
FIG. 7 illustrates an example process of enabling an electronic device to transition from a sleep mode to an intermediate mode and then to a standard mode upon detecting that a user of the electronic device is awake in accordance with some embodiments

FIG. 7 illustrates an example process 700 of enabling an electronic device to transition from a sleep mode to an intermediate mode and then to a standard mode upon detecting that a user of the electronic device is awake in accordance with some embodiments. In this example, the electronic device is operated in a sleep mode 702. While the device is operating in a sleep mode, the device of some embodiments disables all the external lights such that the disturbances to the user may be minimized. As mentioned above, the device may activate a filter mechanism where only certain functionality of the device is enabled when the device is in the sleep mode. The user may configure the device such that the user would not be alerted when the device receives notifications outside of a particular group of contacts. Moreover, ring tone functionality may be adjusted such that notifications to the user are presented in a low-volume ring tone.

In some embodiments, image information is captured using at least one imaging element of the electronic device 704. The captured image information may include at least a portion of the user (e.g., face, eyes, hands, chest, neck, etc.) of the electronic device in some embodiments. The device of some embodiments determine whether the user is awake based at least in part on the captured image information 706. In one example, the captured image information may include the user's eyes. The device may analyze the captured image information and determine that the user is awake upon detecting that the user eyes are open and looking at the device. In another example, the device may analyze captured information of the user's blood vessel(s) to determine that the user's heart rate has sped up, indicating that the user has likely woken up. In addition to the captured image information, the device may determine whether the user is awake based on a current time or other factors. In one example, the device may determine that the user is awake upon determining that a current time is past the set alarm and that the user's eyes are open. In another example, the device may determine that the user is awake upon determining that a current time is in the middle of the day and that the device senses user movement.

The electronic device is caused to enter an intermediate mode when the user is determined to be at least partially awake 708. In some embodiments, functionality of the device is adjusted as the intermediate mode is activated. For instance, the device may display a preliminary information display that includes a current time and date on a display screen of the device when the intermediate mode is activated. Some embodiments determine to activate an intermediate mode when the device determines that the user is at least partially awake. In some embodiments, the device determines that the user is at least partially awake by detecting that the user is looking at the device. Some embodiments further determine a current time to determine that the user is only partially awake as opposed to being fully awake. For instance, the device may determine that the user is only partially awake when the device detects that the user is looking at the device and a current time is 2 a.m. The device of some embodiments may therefore enter an intermediate mode where information is displayed.

In some embodiments, the electronic device is caused to return to a standard mode of operation upon detecting a trigger from the user 710. Functionality of the device may be adjusted as the standard mode is activated. For instance, the device may adjust the ring tone to a vibrant ring tone upon receiving any type of notification. The brightness level of a display screen may be increased upon the device returning to operating in the standard mode. Some embodiments activate the standard mode from the sleeping mode without activating the intermediate mode. In some embodiments, the device may determine whether to directly activate a standard mode from a sleeping mode by determining a current time in addition to determining that the user is awake. Some embodiments activate the standard mode upon determining that the current time is in the middle of the day and skip the intermediate mode that may be typically activated while the user is half asleep and most likely does not intend to fully wake up (e.g., in the middle of the night, in the middle of a nap before the alarm is set to go off).

Figure 8:
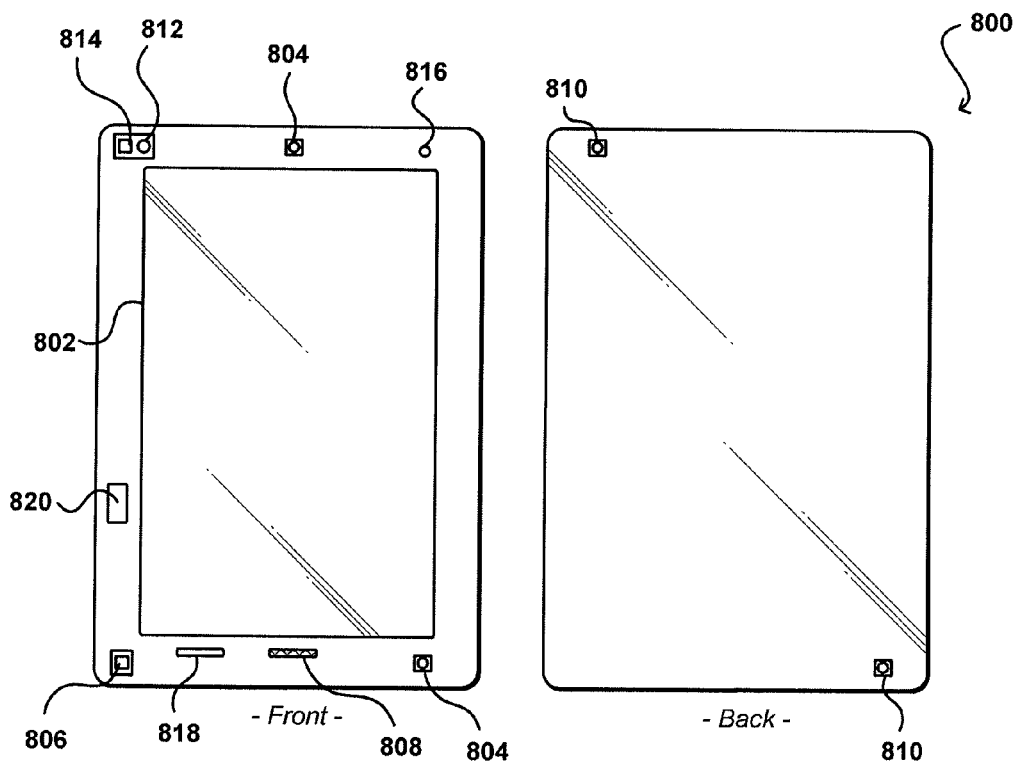
FIG. 8 illustrates front and back views of an example electronic device that can be used in accordance with various embodiments.

FIG. 8 illustrates front and back views of an example electronic computing device 800 that can be used in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 800 has a display screen 802 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 804 on the front of the device and two image capture elements 810 on the back of the device. It should be understood, however, that image capture elements could also, or alternatively, be placed on the sides or corners of the device, and that there can be any appropriate number of capture elements of similar or different types. The imaging elements also can be of similar or different types. Each imaging element 804 and 810 may be, for example, a camera, a charge-coupled device (CCD), a motion detection sensor, an IR sensor, an ambient light sensor, or other image capturing technology. The device can use the images (e.g., still or video) captured from the imaging elements 804 and 810 to detect and analyze a portion of the user of the device (e.g., face, eyes, chest, neck, etc.) to make a determination as to whether the user is asleep.

The example device in FIG. 8 includes a digital video camera 816 for capturing image information using ambient light as known in the art. The example device also includes an infrared (IR) emitter 812 and two IR detectors 814, 806 (although a single detector and two emitters could be used as well within the scope of the various embodiments). The IR emitter 812 can be configured to emit IR radiation, and each detector can detect the IR radiation reflected from a user (or other such surface or object). By offsetting the detectors in this example, each detector will detect radiation reflected at different angles.

In the example illustrated in FIG. 8, a first IR detector 814 is positioned substantially adjacent to the IR emitter 812 such that the first IR detector will be able to capture the infrared radiation that is reflected back from a surface, such as a viewer's retinas, in a direction that is substantially orthogonal to the capture plane of the detector. The second IR detector 806 is positioned a distance away from the IR emitter 812 such that the detector will only detect IR radiation reflected at an angle with respect to the orthogonal direction. When imaging a retro-reflector such as a user's retina, the second IR emitter will detect little to no reflected radiation due to the IR emitter, as the retina will not significantly reflect in the direction of the second emitter (although defects, particulates, or variations may deflect some of the radiation). As discussed later herein, this difference among images can be used to determine the position (and other aspects) of the retinas of a user, as the difference in IR reflection between the two images will be significant near the pupils or other such features, but the remainder of the images will be substantially similar.

In an alternative embodiment, a computing device utilizes a pair of IR emitters (e.g., IR light emitting diodes (LEDs), IR laser diodes, or other such components), to illuminate a user's face in a way that is not distracting (or even detectable) to the user, with the reflected light being captured by a single IR sensor. The LEDs are separated a sufficient distance such that the sensor will detect reflected radiation from a pupil when that radiation is emitted from the LED near the sensor, and will not detect reflected radiation from the pupil when that radiation is emitted from the LED positioned away from the sensor. The sensor can capture IR images that enable the device to analyze features of the user that reflect IR light, such as the pupils or teeth of a user. A similar approach can be used that utilizes a single IR emitting diode and a pair of IR sensors, as discussed above. Thus, the device can either direct IR from two locations or detect IR from two locations, with only one of those locations receiving retro-reflected radiation from a user's retinas.

In one embodiment, a single detector can be used to detect radiation reflected at two different wavelengths. For example, a first LED could emit radiation at a wavelength (e.g., 940 nm) that is reflected by the retina, and a second LED could emit radiation at a wavelength (e.g., 1100 nm) that is absorbed by the cornea and/or other portions of the human eye. Specific wavelengths can be selected within selected wavelength ranges, based at least in part upon their reflective properties with respect to the human eye. For example, experiments indicate that light has less than a 50% absorption rate (for the typical human eye) under about 940 nm, above 50% absorption between about 940 nm and about 1030 nm, around 50% absorption for wavelengths between about 1040 nm and about 1100 nm, and about 100% absorption at 1150 nm and above. Thus, emitters can be selected that fall within at least some of these ranges, such as a first IR emitter that has significantly less that 50% absorption and a second IR emitter that has significantly greater than 50% absorption. The specific wavelengths can further be based, in at least some embodiments, upon the wavelengths of available devices. For example, an available laser diode at 904 nm can be selected that has a relatively low absorption rate, and an available laser diode at 980 nm or 1064 nm can be selected that has a relatively high absorption rate. In some embodiments, the power output of the higher wavelength diode can be scaled up to substantially match the perceived brightness of the lower wavelength diode by a CMOS sensor (or other such detector), the sensitivity of which might fall off to around zero at a value of about 1100 nm, such that in at least one embodiment the two emitters have wavelengths of 910 nm and 970 nm).

An advantage to using two wavelengths is that the LEDs can emit the radiation simultaneously, as long as a resulting image is able to be decomposed in order to extract image information corresponding to each wavelength. Various approaches for decomposing such an image are discussed elsewhere herein. The LEDs then could both be positioned near the camera, or a single LED or emitter can be used near the camera if that LED operates at (at least) the two frequencies of interest.

The emitter(s) and detector(s), and any ambient light camera(s) or other image capture element(s), can be positioned on the device in locations that are least likely to interfere with the user's operation of the device. For example, if it is determined that average users hold the device by the middle of either side of the device and primarily on the right side or on the bottom of the device, then the emitter and detectors can be positioned at the corners of the device, primarily on the left-hand side or top of the device. In another embodiment, there may be additional IR emitters (not shown) positioned on the device that transmit IR at different frequencies. By detecting which frequencies are received by the detectors, the device can determine specific information as to the orientation of the users gaze. Further discussion of using IR light to detect relative eye position can be found in co-pending U.S. patent application Ser. No. 12/786,297, filed May 24, 2010, and entitled "Determining Relative Motion as Input," which is hereby incorporated herein by reference for all purposes.

The example device in FIG. 8 also includes a separate detection element 820, such as a motion sensor, heat signature detector, or light sensor. Such an element can provide input such as whether there is sufficient lighting for an image to be analyzed, as well as whether there is potentially a person in the room for purposes of activating an image capture. Further, a light-detecting sensor can help the device compensate for large adjustments in light or brightness, which can cause a user's pupils to dilate, etc. For example, when a user is operating a device in a dark room and someone turns on the light, the diameters of the user's pupils will change. As with the example above, if the device includes a display element that can operate in different modes (e.g., a sleep mode, an intermediate mode, etc.), the device may also switch modes based on changes in the user's pupil dilation. In order for the device to not improperly interpret a change in separation between the device and user, the light detecting sensor might cause gaze tracking to be temporarily disabled until the user's eyes settle and a recalibration process is executed. Various other such approaches to compensate for light variations can be used as well within the scope of the various embodiments.

The computing device can also include at least one microphone or other audio capture elements capable of capturing audio data, such as words spoken by the user of the device, snoring sounds being made by the user of the device, etc. in order to assist in the determination of whether the user is asleep, although audio elements are not required in at least some devices. In this example there is one microphone 808 on the front side of the device. While this device only has one microphone, some devices may have at least one microphone on each side and/or corner of the device, or in other appropriate locations.

The device 800 in this example also includes one or more orientation- or motion-determining element 818, such as an accelerometer, gyroscope, digital compass, or inertial sensory, that can assist with movement and/or orientation determinations. Some embodiments may determine motion of the device, which can help to predict blur or focus of a captured image using various approaches described herein.

Figure 9:
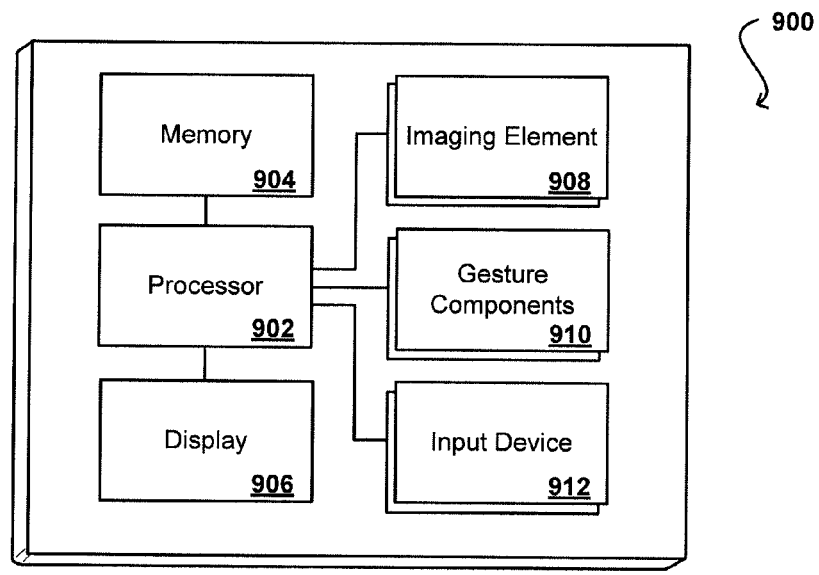
FIG. 9 illustrates a set of basic components of an electronic device such as the device described with respect to FIG. 8.

FIG. 9 illustrates a set of basic components of an electronic computing device 900 such as the device 800 described with respect to FIG. 8. In this example, the device includes at least one processing unit 902 for executing instructions that can be stored in a memory device or element 904. As would be apparent to one of ordinary skill in the art, the device can include many types of memory, data storage, or computer-readable media, such as a first data storage for program instructions for execution by the processing unit(s) 902, the same or separate storage can be used for images or data, a removable memory can be available for sharing information with other devices, and any number of communication approaches can be available for sharing with other devices.

The device typically will include some type of display element 906, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 908 such as a camera, sensor, or detector that is able to image a facial region of a user. The imaging element can include any appropriate technology, such as a CCD imaging element having a sufficient resolution, focal range and viewable area to capture an image of the user when the user is operating the device. Methods for capturing images using an imaging element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application or other device.

The example computing device 900 also includes at least one separate gesture sensor 910 operable to capture image information for use in determining gestures or motions of the user, which will enable the user to provide input through the portable device without having to actually contact and/or move the portable device. A gesture sensor can have the same or a similar form factor as at least one camera on the device, but with different aspects such as a different resolution, pixel size, and/or capture rate.

In some embodiments the device can include at least one additional input device 912 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

A number of other approaches can be used as well within the scope of the various embodiments. For example, thermal imaging or another such approach could be used to attempt to determine and track the position of at least some aspect of a human user. In many instances the imaging system is desired to be small and cheap enough for mass marketing, such that simple or conventional imaging approaches and components can be preferred. Certain existing cameras can detect infrared radiation, but typically utilize an IR filter. Utilizing these cameras without the IR filter, and potentially with an ambient light filter, can allow these relatively inexpensive cameras to be used as IR detectors.

Figure 10:
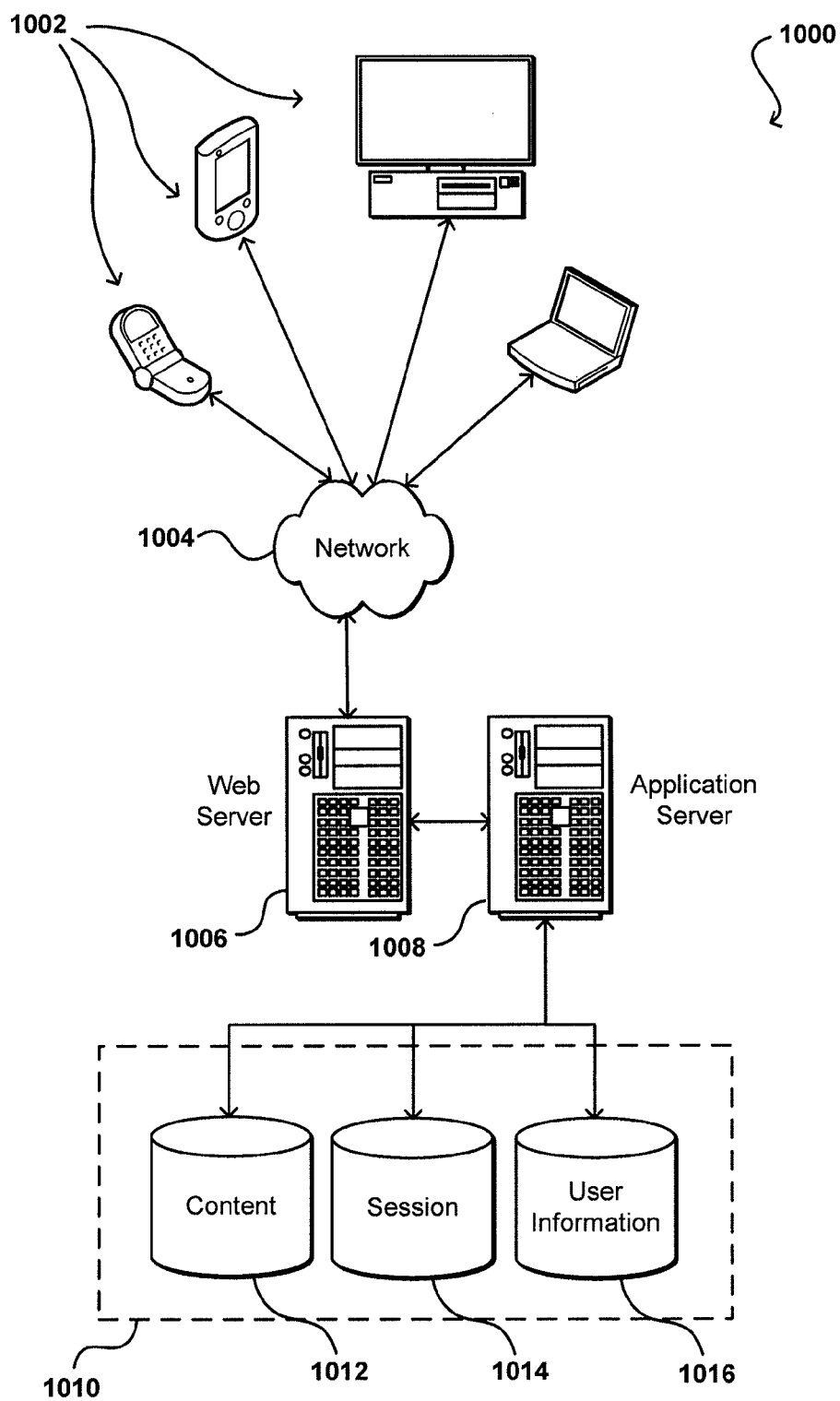
FIG. 10 illustrates an example of an environment for implementing aspects in accordance with various embodiments.

As discussed, different approaches can be implemented in various environments in accordance with the described embodiments. For example, FIG. 10 illustrates an example of an environment 1000 for implementing aspects in accordance with various embodiments. As will be appreciated, although a Web-based environment is used for purposes of explanation, different environments may be used, as appropriate, to implement various embodiments. The system includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1006 for receiving requests and serving content in response thereto, although for other networks, an alternative device serving a similar purpose could be used, as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1006 in the form of HTML, XML or another appropriate structured language in this example. The handling of all requests and responses, as well as the delivery of content between the client device 1002 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing content (e.g., production data) 1012 and user information 1016, which can be used to serve content for the production side. The data store is also shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of enabling a mobile electronic device to determine when to modify functionality of the mobile electronic device, the method comprising:
   activating a standard mode of operation of the mobile electronic device;
   capturing first image information using at least one camera of the mobile electronic device, the first image information including image information of at least a portion of a user of the mobile electronic device;
   determining whether the user is asleep by, at least in part, analyzing the first image information;
   determining a brightness level of at least an area near the user;
   causing, using a processor of the electronic device, the mobile electronic device to automatically enter a sleep mode when the user is determined to be asleep and when the brightness level of the at least an area near the user is determined to be at or below a brightness threshold, the mobile electronic device having less active functionality in the sleep mode than when the electronic device is in the standard mode;
   capturing second image information using the at least one imaging element of the electronic device when the mobile electronic device is in the sleep mode;
   determining that the user is awake by, at least in part, analyzing the second image information;
   causing, using the processor of the mobile electronic device, the mobile electronic device to enter an intermediate mode when the user is determined to be awake, the mobile electronic device having more active functionality in the intermediate mode relative to when the mobile electronic device is in the sleep mode and less active functionality in the intermediate mode relative to when the mobile electronic device is in the standard mode; and
   causing, using the processor of the mobile electronic device, the mobile electronic device to return to the standard mode of operation upon detecting a trigger from the user.

2. The method of claim 1, further comprising:
   illuminating the user with infrared (IR) light, wherein determining whether the user is asleep comprises analyzing the first image information to determine a reflection by at least one retina of the user.

3. The method of claim 1, further comprising:
   illuminating the user with infrared (IR) light; and
   detecting a face from the first image information, wherein determining whether the user is asleep comprises:
   analyzing the detected face to determine whether the detected face is of the user; and
   determining, from the detected face, whether eyes of the user are closed for a period of time when the detected face is determined to be of the user.

4. The method of claim 1, wherein determining whether the user is asleep comprises determining whether the first image information indicates at least one of a breathing rate decrease, the user looking at the mobile device, a body temperature decrease, or a breathing pattern change.

5. The method of claim 1, further comprising:
illuminating the user with infrared (IR) light, wherein determining whether the user is asleep comprises analyzing the first image information to determine whether an amount of user movement is below a certain threshold.

6. The method of claim 1, wherein the user is determined to be awake when the second image information indicates that the user is looking directly at the mobile electronic device.

7. A method of enabling a mobile electronic device to adjust one or more functional aspects of the mobile electronic device, the method comprising: operating, while a user is determined to be asleep, in a sleep mode using a processor of the mobile electronic device; capturing, while in the sleep mode, image information using at least one imaging element of the mobile electronic device, the image information including a brightness level of a surrounding area of the mobile electronic device; determining whether the user is awake by, at least in part, analyzing the image information; and causing, by the processor of the mobile electronic device, the mobile electronic device to operate in an intermediate mode, the mobile electronic device having more active functionality in the intermediate mode relative to when the mobile electronic device is in the sleep mode and less active functionality in the intermediate mode relative to when the mobile electronic device is in a standard mode.

8. The method of claim 7, wherein the at least one imaging element of the mobile electronic device includes at least one of a camera, an infrared (IR) sensor, and a thermal imaging sensor.

9. The method of claim 7, wherein analyzing the captured image information includes:
detecting a face from the captured image information;
performing facial recognition of the user using the detected face; and
upon recognizing the face, determining whether the user is looking at the mobile electronic device.

10. The method of claim 7, wherein the image information includes infrared (IR) light that was emitted by an infrared source of the mobile electronic device and reflected by at least one retina of the user.

11. The method of claim 7, wherein the intermediate mode includes at least one of a current time and calendar information is displayed to the user.

12. The method of claim 7 further comprising:
detecting the brightness level of a the surrounding area of the mobile electronic device using an ambient light sensor, wherein the one or more functional aspects adjusted includes at least one of the brightness level of a display element of the mobile electronic device and the brightness level of one or more LEDs on the mobile electronic device.

13. The method of claim 7, wherein the one or more functional aspects adjusted includes at least one of a ring tone of the mobile electronic device from a loud ring to a low-volume ring and a vibration mode of the mobile electronic device.

14. The method of claim 7, wherein a set of filters are activated upon entering the intermediate mode such that the mobile electronic device notifies the user only upon receiving phone calls or emails from a pre-selected set of contacts.

15. The method of claim 7, wherein a set of filters are activated upon entering the intermediate mode such that the mobile electronic device notifies the user only upon alerts and notifications from a pre-selected set of applications.

16. The method of claim 7 further comprising:
detecting a particular gesture of the user; and
upon detecting the particular gesture, modifying the mobile electronic device from operating in the intermediate mode to operating in a third mode that enables the mobile electronic device to activate a standard mode of operation.

17. The method of claim 7, wherein the functional aspects adjusted as the mobile electronic device is modified from operating in one mode to another mode is configurable by the user of the device.

18. The method of claim 7, wherein analyzing the captured image information includes determining whether the user is looking at the mobile electronic device.

19. A method of enabling a mobile electronic device to switch between different operational modes that correspond to an attention level of a user of the mobile electronic device, the method comprising:
activating a standard mode that adjusts a set of functionalities of the mobile electronic device;
capturing first image information of a user using at least one imaging element on the mobile electronic device;
determining, based at least in part on the first image information, that the user is asleep;
determining a brightness level of at least an area near the user;
causing the mobile electronic device to enter a sleep mode when the user is determined to be asleep and when the brightness level of the at least an area near the user is determined to be at or below a brightness threshold, the mobile electronic device having less active functionality in the sleep mode relative to when the mobile electronic device is in the standard mode;
capturing, while in the sleep mode, second image information;
determining, based at least in part on the second image information, that the user is awake; and
causing the mobile electronic device to enter an intermediate mode, the mobile electronic device having more active functionality in the intermediate mode relative to when the mobile electronic device is in the sleep mode and less active functionality in the intermediate mode relative to when the mobile electronic device is in the standard mode.

20. The method of claim 19, wherein the sleep mode that is activated upon a selection of a user-selectable user interface (UI) item on a display element of the mobile electronic device.

21. The method of claim 19, wherein the intermediate mode is an information mode that displays information including at least a current time, a notification of a number of new emails, a notification of a number of text messages, a current news, and a calendar information.

22. The method of claim 19 further comprising:
detecting at least one of an environmental attribute and a user attribute;
analyzing, using a processor of the mobile electronic device, the at least one of the environmental attribute and the user attribute and a current time to determine a probability that the user of the mobile electronic device is asleep; and
determining whether the probability exceeds a predetermined level,
wherein the sleep mode is activated when the probability exceeds the predetermined level.

23. The method of claim 19, wherein the set of functionalities in the sleep mode are adjusted to notification alerts to notifications from a specified set of contacts.

24. A non-transitory computer-readable storage medium storing a computing program for enabling mobile electronic device to adjust one or more functional aspects of the mobile electronic device, the computer program comprising sets of instructions that, when executed by a processor, cause the processor to: operate, while a user is determined to be asleep, in a sleep mode of the mobile electronic device; capture, while in the sleep mode, image information using at least one imaging element of the mobile electronic device, the image information including a brightness level of a surrounding area of the mobile electronic device; determine whether the user is awake by, at least in part, analyzing the image information; and modify the mobile electronic device from operating in the sleep mode to operating in an intermediate mode, the mobile electronic device having more active functionality in the intermediate mode relative to when the mobile electronic device is in the sleep mode and less active functionality in the intermediate mode relative to when the mobile electronic device is in a standard mode.

25. The non-transitory computer-readable storage medium of claim 24, wherein the sets of instructions when executed further cause the processor to:

determine an appropriate brightness level of the mobile electronic device using pupil detection and ambient light measurements; and displaying information on the mobile electronic device at the determined brightness level when the mobile electronic device is modified to operate in the intermediate mode.

26. The non-transitory computer-readable storage medium of claim 24, wherein the sets of instructions when executed further cause the processor to:

detect a face from the captured image information;

perform facial recognition for the user using the detected face; and upon recognizing the face, determine whether the user is looking at the mobile electronic device.

27. The method of claim 7, wherein the mobile electronic device enters the intermediate mode automatically without user intervention when the mobile electronic device determines that the user is awake.

28. The non-transitory computer-readable storage medium of claim 24, wherein the mobile electronic device enters the intermediate mode automatically without user intervention when the mobile electronic device determines that the user is awake.

\* \* \* \* \*